UNITED STATES PATENT OFFICE.

BERNARD L. CASTOR, OF WILBER, NEBRASKA.

COMPOUND FOR PRESERVING EGGS.

SPECIFICATION forming part of Letters Patent No. 268,184, dated November 28, 1882.

Application filed May 25, 1882. (No specimens.)

*To all whom it may concern:*

Be it known that I, BERNARD L. CASTOR, of Wilber, in the county of Saline and State of Nebraska, have invented a new and Improved Compound for Preserving Eggs, of which the following is full, clear, and exact description.

My improved compound for preserving eggs consists of the following ingredients, mixed about in the following proportions, to wit: fresh slaked lime, one pint; salt, one pint; Portland cement, sometimes called "water-lime," one ounce; white glue, one-half ounce; water, three gallons.

The above ingredients are thoroughly mixed and stirred into the water, and the eggs are then placed into this compound, care being taken to keep the eggs well covered with the fluid or compound.

Great care must be taken not to crush the eggs while placing them into the fluid or compound.

In the above compound the eggs can be preserved for nine months, and if they are to be preserved a longer time the compound or fluid must be one-third stronger or more concentrated.

The eggs, when removed from the compound or liquid after any desired length of time, will be just as fresh and wholesome as they were when placed into the liquid or compound.

Having thus fully described my invention, what I claim as new, and desire to secure by Letters Patent, is—

The herein-described composition of matter for preparing a bath or liquid for preserving eggs, consisting of slaked lime, cement, salt, and white glue, in the proportions stated.

BERNARD L. CASTOR.

Witnesses:
E. B. BERRY,
SAML. D. DAVIS.